US006993442B2

(12) United States Patent
Kanevsky et al.

(10) Patent No.: US 6,993,442 B2
(45) Date of Patent: Jan. 31, 2006

(54) ADAPTIVE DATA COLLECTION (75) Inventors: Valery Kanevsky, San Lorenzo, CA (US); John C. Eidson, Palo Alto, CA (US); Bruce Hamilton, Menlo Park, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/846,301

(22) Filed: May 14, 2004

(65) Prior Publication Data

US 2005/0256679 A1 Nov. 17, 2005

(51) Int. Cl.
G06F 19/00 (2006.01)
(52) U.S. Cl. .................. 702/69; 455/423; 375/224; 340/3.1; 702/179
(58) Field of Classification Search ................ 455/423, 455/424, 425; 342/173; 375/224; 340/3.1, 340/3.3; 702/69, 179, 180, 181
See application file for complete search history.

(56) References Cited

U.S. PATENT DOCUMENTS

| | | | | |
|---|---|---|---|---|
| 5,355,083 A | * | 10/1994 | George et al. | 324/229 |
| 5,465,390 A | * | 11/1995 | Cohen | 455/446 |
| 5,541,510 A | * | 7/1996 | Danielson | 324/233 |
| 5,983,106 A | * | 11/1999 | Bernardin et al. | 455/446 |
| 6,006,095 A | * | 12/1999 | Bernardin et al. | 455/446 |
| 6,041,236 A | * | 3/2000 | Bernardin et al. | 455/446 |
| 6,052,583 A | * | 4/2000 | Bernardin | 455/423 |
| 6,108,800 A | * | 8/2000 | Asawa | 714/47 |
| 6,173,186 B1 | * | 1/2001 | Dalley | 455/446 |
| 6,711,404 B1 | * | 3/2004 | Arpee et al. | 455/423 |
| 6,718,169 B1 | * | 4/2004 | Martti et al. | 455/424 |
| 6,816,810 B2 | * | 11/2004 | Henry et al. | 702/179 |
| 6,844,841 B1 | * | 1/2005 | Masciulli | 342/13 |
| 2003/0088381 A1 | * | 5/2003 | Henry et al. | 702/127 |
| 2003/0101027 A1 | * | 5/2003 | Weber et al. | 702/189 |
| 2003/0187337 A1 | * | 10/2003 | Tarassenko et al. | 600/300 |
| 2004/0116111 A1 | * | 6/2004 | Saunders | 455/423 |
| 2004/0203725 A1 | * | 10/2004 | Lahav et al. | 455/423 |
| 2005/0064864 A1 | * | 3/2005 | Horton et al. | 455/423 |

OTHER PUBLICATIONS

Evans, Greg et al., "The Optimization and Application of the W.C.Y. Lee Propagation Model in the 1900 MHz Frequency Band,"TEC Cellular, Inc., IEEE 1997, pp. 87-91.

Anthony, M. et al, "Computational Learning Theory," Cambridge University Press, 1992, Table of Contents and Cover, 7 pages, (entire document will be furnished upon request).

Shiryaev, A.N., "Probability," Second Edition, translated by R.P. Boas, Springer-Verlag New York Inc., 1989, Cover Page and Table of Contents, 12 pages, (entire document will be furnished upon request).

Devroye, Luc et al, "Combinatorial Methods in Density Estimation," Springer-Verlag New York, Inc., 2001, Cover Page and Table of Contents, 9 pages, (entire document will be furnished upon request).

Yapnik, Vladimir N., "Statistical Learning Theroy," AT&T Research Laboratories, John Wiley & Sons, 1998, Cover Page and Table of Contents, 16 pages (entire document will be furnished upon request).

* cited by examiner

Primary Examiner—Patrick J. Assouad (57) ABSTRACT

One embodiment of the present invention separates the region of measurement space into a plurality of sub-regions and calculates a confidence, for reconstruction of an underlying signal within said space, corresponding to each of the sub-regions. This embodiment can then accept measurements from mobile measuring devices within said measurement space and store those measurements if they originate from devices in sub-regions having a confidence below an acceptable value.

23 Claims, 4 Drawing Sheets

ADAPTIVE DATA COLLECTION

CROSS REFERENCE TO RELATED APPLICATION

The present application is related to concurrently filed, co-pending, and commonly-assigned U.S. patent application Ser. No. 10/846,061, entitled "CONFIDENCE BLANKET FOR RANDOMLY-LOCATED MEASUREMENTS," the disclosure of which is hereby incorporated herein by reference.

TECHNICAL FIELD

The present application is directed toward the field of managing measurements, and more specifically to the selective recordation of large numbers of measurements that are distributed temporally and/or spatially.

BACKGROUND OF THE INVENTION

In order to properly maintain many systems, measurements must be taken in order to understand the system's behavior, to help optimize the system's operation, and to provide fault detection. As a system becomes larger and more dispersed, traditional measurement techniques can become more difficult to implement and more expensive to manage. Systems such as cellular telephone networks, internet monitoring, and epidemic control applications, for example, have the potential to become quite large and dispersed, thus requiring large numbers of measurements to properly manage. Traditional techniques for measuring such systems often suffer from "under-sampling", because the cost and difficulty of installing and communicating with a sufficient number of probes is simply too high. These difficulties can become exacerbated in areas where the system is volatile. The more volatile a system is, the more measurements are generally needed in order to property understand it.

Currently, there is considerable interest in controlling the cost of managing these systems by using devices that may already present within the system as platforms for system measurement. For example, the use of customer owned telephones as mobile measuring platforms could be particularly appealing for the providers of cellular telephone networks because of the large numbers of devices in use, the services are already physically dispersed, and the devices already contain an inherent computing and communication capability. Further, many of today's cellular telephones already measure their location, characteristics of the cellular infrastructure, and have the ability to access external devices.

However, unlike a traditional measurement system that uses dedicated measurement platforms specifically placed to provide an efficient measurement pattern, a measurement system that uses the mobile devices of a consumer will have very little control over the time and place of the actual measurements. Instead of pre-selecting the time and place for data collection, such a system will likely have to accommodate the random spatial and/or temporal distribution of individual data collection events intrinsic to the unpredictable movement and usage of the customers.

This inherent volatility makes it important that systems such as these are given some ability to acquire more measurements in some areas than in others. Additional difficulties may arise because although a signal that is constant over a measurement area will need only few measurements to reconstruct, signals that are highly volatile can require a large number of measurements to provide the resolution necessary for signal reconstruction. System such as a cellular telephone network face environments where signals can have very large changes in measured signal value over comparatively small geographic areas. This inherent volatility makes it important that systems such as these be given some ability to acquire more measurements in some areas than in others.

Because any system will invariably have a limited capacity to process and store data, that system can be made more efficient if it stores only the data that is necessary to successfully manage the system. Efficient systems, therefore, typically filter out measurements in areas of low volatility, but continue to collect measurements in areas of high volatility. Thus, the system can optimize the management of its different aspects while using a minimum amount of data.

BRIEF SUMMARY OF THE INVENTION

One embodiment of the present invention selectively stores measurements of an underlying signal made from a plurality of mobile measuring platforms. Because these measurements often occur randomly in both time and location, embodiments can determine which measurements should be stored, and which measurements are unnecessary for further signal reconstruction.

Another embodiment of the present invention separates the region of measurement space into a plurality of sub-regions and calculates a confidence, for reconstruction of an underlying signal within said space, corresponding to each of the sub-regions. This embodiment can then accept measurements from mobile measuring devices within said measurement space and store those measurements if they originate from devices in sub-regions having a confidence below an acceptable value.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

The environment containing the measurable aspects of a complex system can be referred to as the measurement space. Embodiments of the present invention can be used by a system that needs to manage a large number of randomly taken measurements within its measurement space. The measurement space of a cellular telephone network, for example, can be represented as a geographic region or domain, that is segmented into a plurality of sub-regions or sub-domains. A cellular telephone network provider may then be able to take advantage of the large number of mobile measurement platforms it already has distributed throughout its measurement space, in the form of customer owned cellular telephones to increase the efficiency of its signal measurements. In order to utilize customer telephones, however, the provider will need to efficiently manage the large number of measurements that are taken randomly (both spatially and temporally) through these sub-regions.

Figure 1:
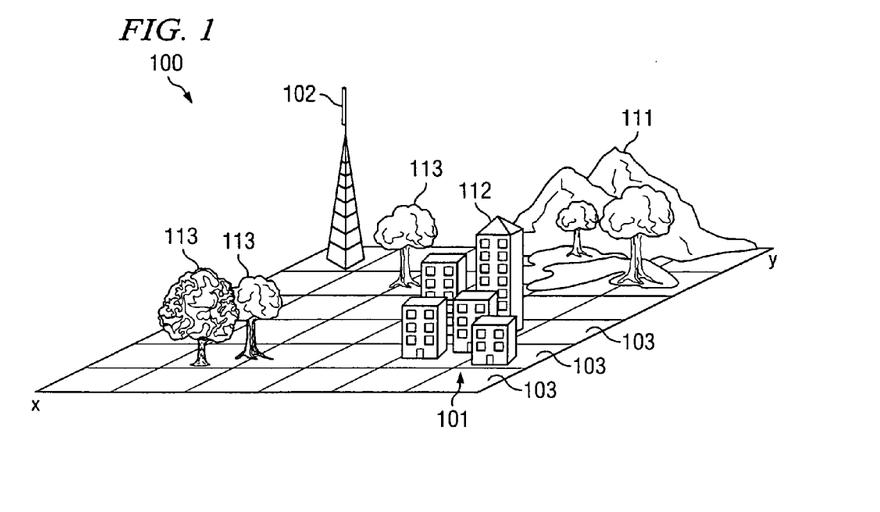
FIG. 1 illustrates the geographic region of a cellular telephone network.

FIG. 1 illustrates the geographic region for a cellular telephone network. The service area for network 100 can be represented by measurement space 101 bounded by an x and a y axis, with a transmission tower 102 located at the origin. Measurement space 101, may be further divided into 36 sub-regions 103 representing a portion of the individual areas within range of transmission tower 102. In order to properly maintain cellular service, the network provider needs to have an accurate measurement of the signal emitted by tower 102 in every sub-region 103. However, the signal emitted by tower 102 may not be uniformly measurable across the sub-regions. Physical obstacles, such as mountains 111, buildings 112, and trees 113 will interfere, reflect, and otherwise distort the underlying signal within a sub-region. This volatility leads to increased uncertainty in the measurements, thus making reconstruction of the underlying signal more difficult in sub-regions that contain such obstacles.

Note that if the provider uses customer telephones as measurement platforms, then the location of each measurement platform and its availability for measurement is controlled by the customer, not the network provider. Consequently, the provider cannot direct measurements, particularly to those areas that require them, but rather can only accept measurement. Furthermore, the sheer number of platforms (and the number of measurements taken by each platform) can make management of any measurement system difficult. Embodiments of the present invention allow a measurement management system, such as one used by the cellular telephone network provider of FIG. 1, to intelligently determine which incoming measurements should be stored, and which should be discarded. Therefore, no matter how many measurement are taken, only those necessary for the accurate reconstruction of the underlying signal will be stored.

One basis for making such a determination in a cellular telephone network is the confidence of the provider in the signal reconstruction for a sub-region 103. If the accuracy of that reconstruction could be quantified, then a system could use that quantification as a basis for determining whether additional measurements of the underlying signal are necessary in that sub-region 103.

One such calculation is as a "Confidence Blanket" calculation and is described in commonly owned and concurrently filed U.S. patent application Ser. No. 10/846,061, entitled "CONFIDENCE BLANKET FOR RANDOMLY-LOCATED MEASUREMENTS," the disclosure of which is hereby incorporated herein by reference. It will be understood that embodiments of the present invention are not limited to the use of a confidence blanket, but rather can utilize any calculation that can quantify the accuracy of an underlying signal's reconstruction.

By taking a small scattering of sample data measurements, a number that is far below the capacity of the system's storage, a preliminary analysis of the nature of the measurement of the system's signal can be conducted in each sub-region. This analysis may be in the form of a probability range quantification for the value of the signal in each sub-region. Measurements that can be used to reconstruct a signal in each sub-region can vary widely depending on the volatility of the underlying signal in each sub-region. If the confidence the system has in the reconstruction can be quantified, however, this quantification can provide a mechanism for determining whether to accept or reject additional measurements. If a new measurement originates from an area where the confidence in a signal's reconstruction is satisfactory, then that measurement may not need to be stored. If a new measurement originates from an area where the confidence in the signal's reconstruction is low, however, it may be accepted for storage and later use. This process can then be continued until the system can reconstruct the underlying signal in each of the sub-regions with an acceptable confidence.

Embodiments of the present invention may use a mathematical analysis, such as the one described in the above listed concurrently filed application, that places error bounds and confidence probability on mathematical models built using randomly acquired measurements, such as the measurement of the spatial variation of the radio frequency (RF) fields associated with a cellular phone infrastructure. The analysis herein uses a probably approximately correct (PAC) model of the underlying data, as detailed by M. Anthony and N. Biggs in *Computational Learning Theory*, Cambridge University Press, UK (1997), the disclosure of which is hereby incorporated herein by reference. A measurement management system in accordance with the present invention may use this or any other similar mathematical technique that can provide a quantification of a confidence that the system has in reconstructing the underlying signal.

If a set of measurements is treated as a family of mutually independent random variables (measurements) $\xi(z)$, indexed by a space variable $Z \in D$, where D is a domain in $\mathbb{R}^k$, in a Euclidean space of dimension k, $\xi(z)$ can represent a set of measurements of, for example, the RF power of a cellular transmission tower. If the mean value $E\xi(x)=m(x)$ is an unknown function of x describing the physical variable being measured, m(x) can be estimated based on spatially distributed observations $\xi(z_i)$ at n points.

An estimator M(x) can be constructed for m(x) that defines $M(x)=M(x; \xi(z_1), \ldots, \xi(z_n))$ for $x \in D$, and measurements $\xi(z_i)$ such that for any $\epsilon>0$, and $\delta>0$ there is an n, such that $$P\left\{\sup_{x \in D} |M(x; \xi(z_1), \ldots, \xi(z_n)) - m(x)| < \varepsilon\right\} > 1 - \delta \quad (1)$$

If (1) is satisfied for an estimator M(x), a Confidence Blanket (CB) can be constructed for m(x), where the CB at the confidence level 1-δ is defined such that for all x∈D $$M(x; \xi(z_1), \ldots, \xi(z_n)) - \varepsilon < m(x) < M(x; \xi(z_1), \ldots, \xi(z_n)) + \varepsilon \quad (2)$$

It can then be shown that:

$$P\left\{\sup_{x \in D} |M(x) - m(x)| > \varepsilon\right\} \leq \quad (3)$$
$$2(n^2 - n + 2)(\exp(-\lambda^2 h^2(n)) + 4\exp(-n\beta^2/32))$$

where $\lambda = \sqrt{2}/(b-a)$, and $h(n) = (n(\gamma-\beta))^{1/2}(\varepsilon - Kr^\alpha)$. The right hand side in (3) can be then evaluated for a set of measurements where ε is an error bound, value for β is chosen to minimize δ, an analysis can be made of the value of δ for different n. In particular, what value of n (number of measurements) is required to give acceptable confidence (e.g., 95%) for realistic values of the other parameters. Equation (3) will then bound the probability that the worst error in a signal measurement will exceed ε.

Figure 2:
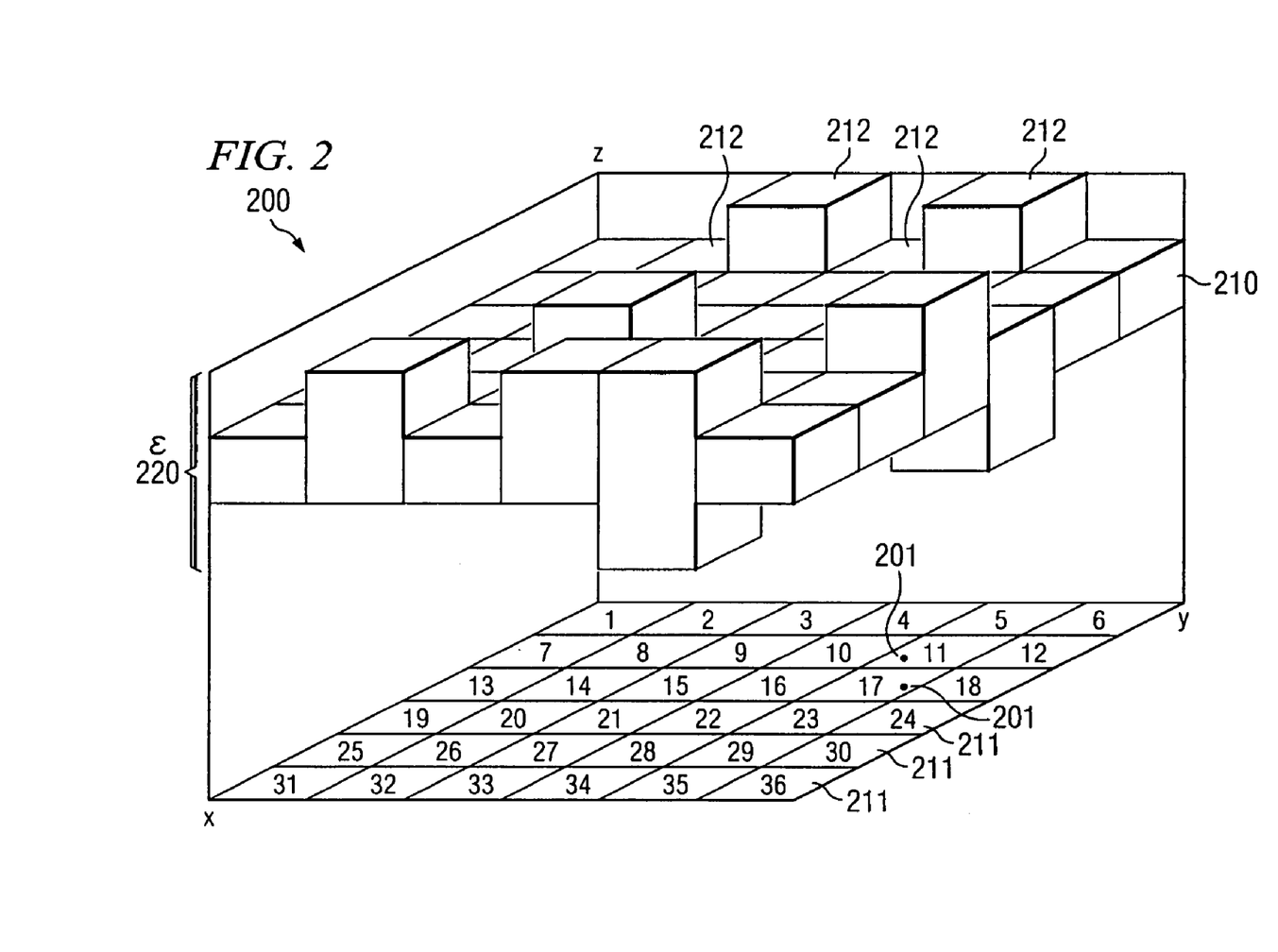
FIG. 2 illustrates an example extended to encompass a two-dimensional position system of measurements.

FIG. 2 illustrates an example in a two-dimensional position system of measurements. Measurements of a signal produced by a cellular telephone transmission tower can be taken at various positions 201 that represent specific positions within a geographical region of a measurement space, such as measurement space 101 of FIG. 1. The value of the measured signal is plotted in the z coordinate. If the geographic region represented by the xy plane is segmented into 36 sub-regions 211, independent confidence blanket pieces 212 can be calculated for each sub-region 211. Together, the collected confidence blanket pieces 212 form a confidence quilt 213.

The example of FIG. 2, illustrates the calculations resulting from an equal number of measurements taken in each sub-region 211. However, as FIG. 1 demonstrates, the underlying signal being measured may not have a constant volatility in each sub-region 211. Thicknesses 220 of confidence blankets 212 represent the error bound ε necessary for reconstruction of the underlying signal in each sub-region if the signal reconstruction in each region is required to have an equal confidence. In sub-regions where the underlying signal is volatile (such as areas near buildings), ε for the underlying signal reconstruction would have to be set unacceptably high, in order to achieve the required δ. For embodiments of the present invention, a phenomenon is considered volatile if it can have a "large" change over a "limited" interval of space or time. Determinations of "large" and "limited" are typically made for each particular application. A phenomenon may be considered not volatile if an upper bound can be set on its change if the corresponding time/space interval is limited.

Figure 3:
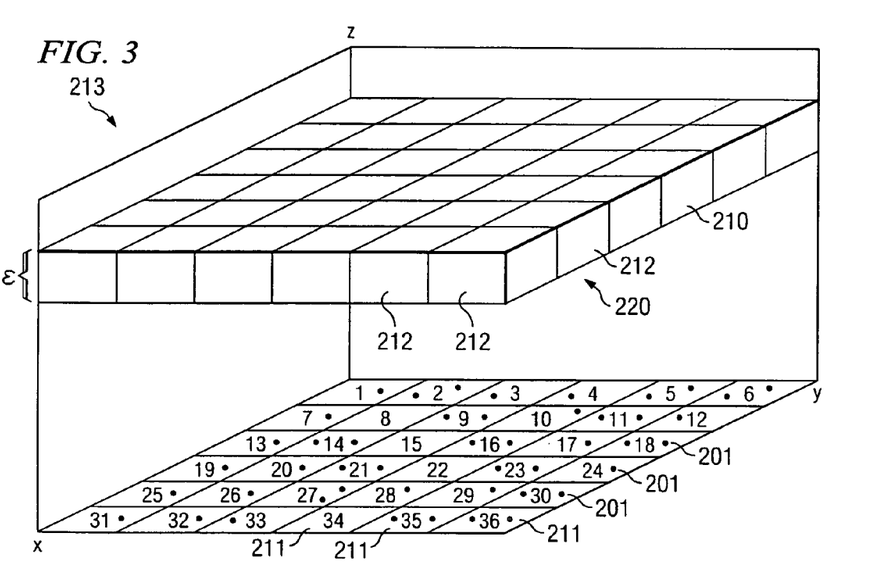
FIG. 3 represents an underlying signal measured in a two-dimensional position system.

FIG. 3 represents the same underlying signal measured in a two-dimensional position system. In this example, however, a constant ε 320 is used in each sub-region 211. Such a condition is consistent with what is necessary for the measurement management of largely dispersed measurement systems, such as in cellular telephone networks. Surface 310 represents an upper-bound for the probable values of the signal in the z coordinate. Surface 320 represents a lower-bound of the probable values of the signal within the z coordinate. Together, surface 310 and surface 320 bound the interval of ±ε of the signal's known value. For each sub-region 211 of a given system, the confidence of the reconstructed signal will depend upon three main variables: the volatility of the signal being measured, the density of measurements, and the quality of the measurements taken. For the example systems depicted in the present application, all measurements are illustrated as having an equal quality, but it will be recognized that this is not a necessary restriction and that measurements of variable quality may be easily accommodated by embodiments of the present invention. Therefore, the confidence blanket 311 in each given region 211 will be a result of the volatility of the signal within the sub-region, and the number of measurements taken within the sub-region.

The system of FIG. 3 represents the state of a cellular telephone network measurement system after an initial gathering of measurements. A small number of measurements can be made (far below the storage capacity of the system) in each sub-region 211, and initial calculations, using equation (3), can be made. Because, the appropriate ε is a constant through each sub-region 211, a system designed to require a δ=0.05 (95% confidence) in each sub-region 211, will need a different number of measurements depending on the sub-region's signal volatility.

Thus embodiments of the present invention can manage a system that incorporates a large number of random (temporal and/or geographic) measurements, such as a system that monitors a cellular telephone network using the customers' cellular telephones, by intelligently determining which measurements need to be saved and which ones may be discarded. After the system has established an initial confidence quilt, such as in FIG. 3, over a geographical area, each additional measurement can be analyzed based upon its originating region 211. If this region requires additional measurements in order to obtain the δ desired, the measurement could be saved. If, however, its originating region 211 had sufficient measurements (n) to obtain the δ desired, the measurement can be disregarded. Alternatively, the oldest measurement can be discarded, or the one which contributes the least information (e.g., the one which is the most redundant) can be discarded.

Figure 4:
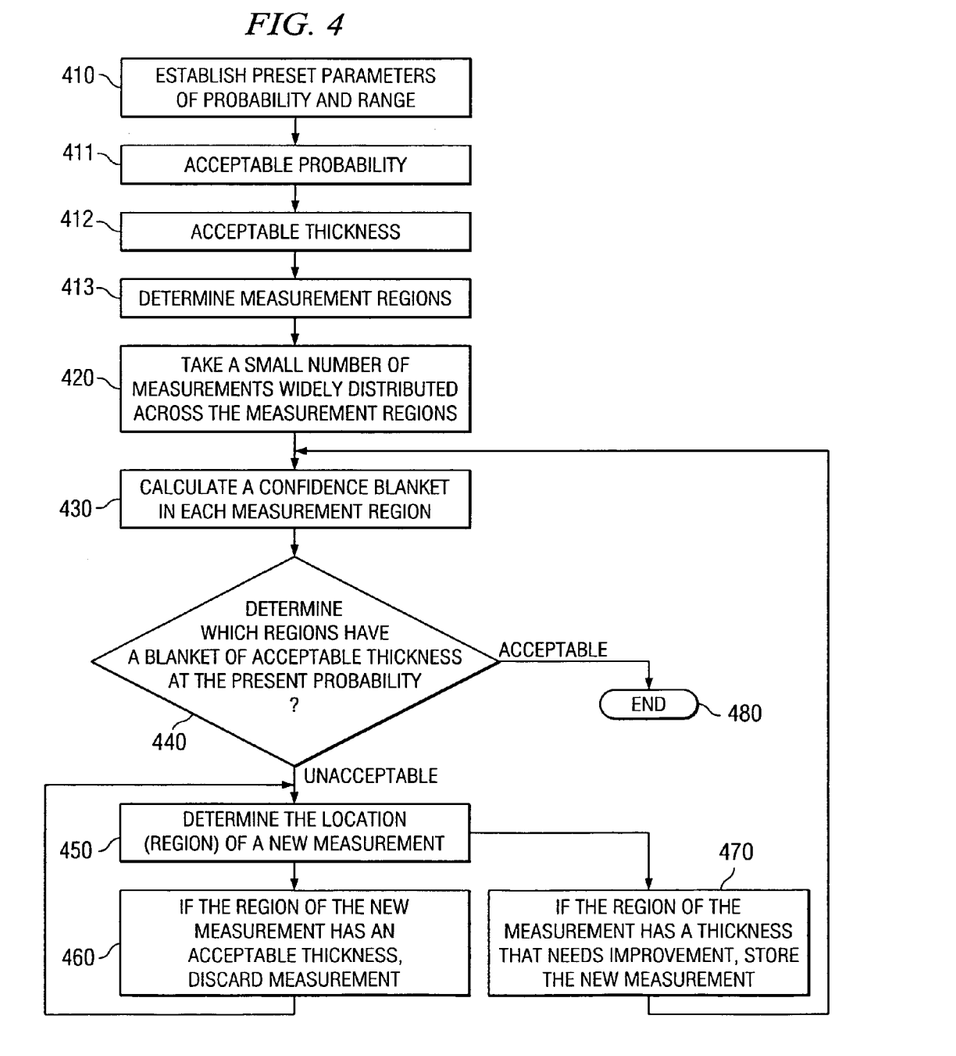
FIG. 4 represents a geographical area in which a signal may have been measured.

FIG. 4 is a flow diagram illustrating an exemplary method in accordance with the present invention. Again, using the example of a cellular telephone network, it would be advantageous to know the value of the signal to some level of confidence within each sub-region of the network. As in the example of FIG. 3, a confidence blanket can be calculated in each region that is of constant thickness (has a constant ε). Measurements can then be gathered in each region until a predetermined confidence has been reached. To accomplish this, a system may need to take more measurements in regions that have a higher volatility.

In step 410, certain parameters for the calculation of the confidence blankets are preset. Examples of these parameters are an acceptable confidence 411, an acceptable thickness (or range ε) for the confidence blanket 412, and an established set of regions 415. Note that other parameters may be used and the order of parameters 411, 412, and 413 is by was of example only. In step 420 a small number of widely distributed measurements are taken across all of the regions. In step 430, these measurements and the preset parameters from step 410 are used to calculate a confidence blanket in each of the regions. The result may be represented with a graphical representation (such as FIG. 3), and analyzed as a confidence quilt that graphically depicts the confidence of a measurement of a signal within each region of a domain. Once the confidence quilt is calculated, step 440 determines which sub-regions of the confidence quilt have an acceptable confidence. If a sub-region has an acceptable confidence, then there are sufficient measurements in that region to reconstruct the underlying signal. If the sub-region does not have an acceptable confidence, then additional measurements must be taken in that sub-region to improve the reconstruction of the underlying signal. Step 450 determines the location of a new measurement. When a new measurement is made, its location within the measurement space, is determined. If the location of the new measurement is in a sub-region with an acceptable thickness, then this measurement is discarded as unnecessary. If, however, the region of the new measurement has a thickness that is not acceptable, then the new measurement is stored by step 470, and the system would recalculate the confidence blanket of each of the regions, by returning to step 430. By using this method, a system in accordance with the present invention would only store those measurements necessary to improve the confidence blanket and continue with each new measurement to recalculate the confidence quilt. If at any time in step 440 the thickness of each specific confidence blanket piece is acceptable, then no new measurements are necessary and the procedure would end.

When implemented via computer-executable instructions, various elements of embodiments of the present invention are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information.

Figure 5:
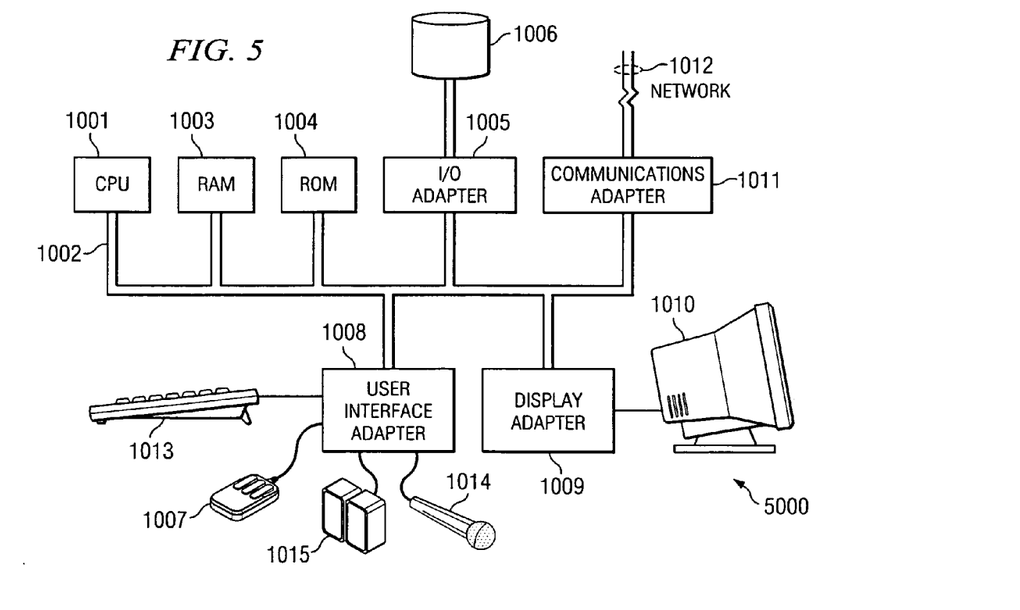
FIG. 5 is a flow diagram illustrating an exemplary method in accordance with the present invention.

FIG. 5 illustrates an example computer system 500 adapted according to embodiments of the present invention. That is, computer system 500 comprises an example system on which embodiments of the present invention may be implemented. Central processing unit (CPU) 501 is coupled to system bus 502. CPU 1001 may be any general purpose CPU. However, the present invention is not restricted by the architecture of CPU 501 as long as CPU 501 supports the inventive operations as described herein. CPU 501 may execute the various logical instructions according to embodiments of the present invention. For example, CPU 501 may execute machine-level instructions according to the exemplary operational flows described in conjunction with FIG. 5.

Computer system 500 also preferably includes random access memory (RAM) 503, which may be SRAM, DRAM, SDRAM, or the like. Computer system 500 preferably includes read-only memory (ROM) 504 which may be PROM, EPROM, EEPROM, or the like. RAM 503 and ROM 504 hold user and system data and programs, as is well known in the art.

Computer system 500 also preferably includes input/output (I/O) adapter 505, communications adapter 511, user interface adapter 508, and display adapter 509. I/O adapter 505, user interface adapter 508, and/or communications adapter 511 may, in certain embodiments, enable a user to interact with computer system 500 in order to input information, such as parameter necessary for the calculation of confidence levels.

I/O adapter 505 preferably connects to storage device(s) 506, such as one or more of hard drive, compact disc (CD) drive, floppy disk drive, tape drive, etc. to computer system 500. The storage devices may be utilized when RAM 503 is insufficient for the memory requirements associated with storing data for the appropriate calculations. Communications adapter 511 is preferably adapted to couple computer system 500 to network 512. User interface adapter 508 couples user input devices, such as keyboard 513, pointing device 507, and microphone 514 and/or output devices, such as speaker(s) 515 to computer system 500. Display adapter 509 is driven by CPU 501 to control the display on display device 510 to, for example, display the user interface of embodiments of the present invention.

It shall be appreciated that the present invention is not limited to the architecture of system 500. For example, any suitable processor-based device may be utilized, including without limitation personal computers, laptop computers, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

What is claimed is:

1. A method of managing measurements, said method comprising:
    providing at least one mobile measuring device within a measurement space, wherein said space has a measurable phenomenon; and
    determining a usefulness of a measurement of said phenomenon taken from said device by using a calculation of a confidence of a reconstruction of said phenomenon.

2. The method of claim 1 wherein said confidence calculation computes a probability that an error of said measurement will fall within a range.

3. The method of claim 1 wherein said space is further divided into a plurality of sub-regions, and further comprising:
    calculating a confidence for the reconstruction of said phenomenon within each of said sub-regions.

4. The method of claim 3 wherein the measurement originates from a first sub-region, wherein said confidence calculation for said first sub-region denotes an unacceptable reconstruction of said signal, and further comprising:
    storing the measurement.

5. The method of claim 3 wherein the measurement originates from a second sub-region, wherein said confidence calculation for said second sub-region denotes an acceptable reconstruction of said signal, and further comprising:
    disregarding the measurement.

6. The method of claim 1 further comprising:
    storing successive measurements until said confidence denotes an acceptable reconstruction of said signal.

7. A system for managing measurements of a phenomenon within measurement space, said system comprising:
    at least one mobile device capable of measuring a phenomenon;
    a processor operable to calculate a confidence of a reconstruction of said phenomenon; and
    computer code that calculates said confidence.

8. The system of claim 7 further comprising:
    computer code that calculates an upper and a lower bound for a value of said phenomenon, wherein said confidence is related to a probability that the value of said phenomenon lies between said upper and said lower bound.

9. The system of claim 7 wherein said measurement space is divided into a plurality of sub-regions, and wherein said phenomenon is measured in each said sub-region.

10. The system of claim 9 wherein said reconstruction is independently performed in each sub-region, and wherein said confidence is independently calculated for each said reconstruction.

11. The system of claim 10 further comprising:
a computer readable memory; and
computer code that stores measurements taken in sub-regions with an un-acceptable confidence in the computer readable memory and discards measurements taken in sub-regions with an acceptable confidence.

12. A method for efficiently managing a reconstruction of broadcast signal, said method comprising:
providing a plurality of mobile measurement platforms capable of measuring said signal within a service area;
segmenting said service area into a plurality of sub-regions;
calculating an upper and a lower bound for the value of said signal within each said sub-regions; and
for each said sub-region, calculating a confidence that a measured value of said signal lies between said upper and said lower bound.

13. The method of claim 12 further comprising:
storing a measured value originating from sub-regions with an unacceptable confidence.

14. The method of claim 13 further comprising:
recalculating said upper and said lower bounds for a sub-region after said measurement is stored.

15. The method of claim 12 further comprising:
accepting other measurements from said platforms until the confidence of each said sub-region is acceptable.

16. The method of claim 12 wherein said platforms are consumer owned devices.

17. The method of claim 12 wherein said broadcast signal is a cellular telephone signal and said platforms are cellular telephones.

18. A system for reconstructing a broadcast signal, said system comprising:
a plurality of mobile platforms capable of measuring said signal;
a service area of said signal that is segmented into a plurality of sub-regions;
a processor operable to process computer executable code including code for calculating, in each said sub-region, an upper and a lower bound for a value of said signal, and, code for calculating, in each sub-region, a confidence that a value of a subsequent measurement in said sub-region will be within a range between said upper and said lower bound.

19. The system of claim 18 further comprising:
a computer readable memory; and
code evaluating measurements in each sub-region, wherein said code stores, in said memory, measurements originating in sub-regions with unacceptable confidences.

20. The system of claim 19 wherein measurements originating in sub-regions with acceptable confidences are not stored.

21. The system of claim 18 wherein measurements are taken in one said sub-region until said confidence of said sub-region is above a predetermined value.

22. The system of claim 18 wherein said signal is a cellular telephone signal.

23. The system of claim 18 wherein said platforms are customer owned cellular telephones.

* * * * *

UNITED STATES PATENT AND TRADEMARK OFFICE
CERTIFICATE OF CORRECTION

PATENT NO. : 6,993,442 B2
APPLICATION NO. : 10/846301
DATED : January 31, 2006
INVENTOR(S) : Kanevsky et al.

It is certified that error appears in the above-identified patent and that said Letters Patent is hereby corrected as shown below:

On the title page, in field (56), under "Other Publications", in column 2, line 4, delete "al," and insert -- al., --, therefor.

On the title page, in field (56), under "Other Publications", in column 2, line 12, delete "al," and insert -- al., --, therefor.

On the title page, in field (56), under "Other Publications", in column 2, line 16, delete "Theroy," and insert -- Theory, --, therefor.

Signed and Sealed this

Eighth Day of August, 2006

JON W. DUDAS
*Director of the United States Patent and Trademark Office*